United States Patent Office 3,429,727
Patented Feb. 25, 1969

3,429,727
PROCESS FOR MAKING SYNTHETIC SUEDE
SHEET MATERIAL
Jerome Hochberg, Newburgh, N.Y., assignor to E. I. du Pont de Nemours and Company, Wilmington, Del., a corporation of Delaware
No Drawing. Filed Dec. 22, 1965, Ser. No. 515,764
U.S. Cl. 117—11                        10 Claims
Int. Cl. B44d 5/10

This invention relates to a process for making synthetic microporous sheet material having a suede or napped finish. In particular, this inventon relates to an improved process for making these synthetic suede materials which gives a product which has a uniformly colored suede topcoat and a uniformly colored substrate.

To provide a synthetic suede sheet material which meets the aesthetic requirements for manufacturing shoes, handbags, clothing such as coats, gloves and jackets, it is necessary to have the material uniformly colored in both the suede topcoat and throughout the substrate. In one preferred process, the synthetic suede sheet material is formed by coating a porous substrate, i.e., a polymer impregnated web, with a topcoat. This topcoat is coagulated into a cellular layer having an elongated cell structure in which the longest dimension of the cell is oriented substantially prependicular to the surface of the substrate. The skin from the topcoat is removed by abrasion which reveals the pore structure of the topcoat and gives the material a napped or suede surface. One such method for making a suede sheet material is taught in copending U.S. application S.N. 216,576, now Patent No. 3,284,274 filed Aug. 13, 1962, which is hereby incorporated by reference. Other methods for forming synthetic suede sheet materials are taught in U.S. Patents 3,067,482 and 3,067,-483, issued to J. L. Hollowell. In the preferred process, deep coloration of the topcoat is readily achieved by pigmenting the topcoat composition; however, great difficulties have been encountered in attempting to also obtain a deep uniform color in the substrate. It is extremely uneconomical to pigment the polymer used in the porous substrate since a wide variety of colors are used in suedes and the same porous substrate is used in the manufacture of all types of suede materials and also in the manufacture of all types microporous synthetic sheet materials useful as leather replacements. Dyeing of the substrate after the topcoat is formed results also in dyeing of the topcoat and either gives a topcoat which is not uniformly colored or that has a color different from the intended pigmented color. If the substrate is dyed before the topcoat is applied, the solvent from the topcoat when it is applied leaches color from the substrate and results in a suede topcoat which has a mottled appearance. Applying a pigmented latex to the substrate after the topcoat of the sheet is buffed to a suede surface results in a uniformly colored substrate but the latex penetrates through the substrate into the suede topcoat giving the sheet a spotted appearance. These aforementioned difficulties are readily overcome by using the process of this invention.

Statement of the invention

A known process for making a microporous man-made leather-like suede sheet material which has good smoothness and grain break characteristics involves (1) coating the surface of a porous flexible substrate with a layer of a polymeric solution; (2) coagulating the polymeric component into the form of a cellular layer by bathing the coated sheet in a liquid which is a non-solvent for the polymeric component and which is miscible with the solution solvent; (3) removing substantially all of the solvent from the sheet material; and (4) abrading the surface of the cellular layer to form a suede or napped surface. This invention is directed to an improvement in the above process in which additional steps are performed before step (4), i.e., abrading the surface of the polymeric layer and after step (3). These additional steps are (3a) reducing the non-solvent content of the sheet material to less than 90% by weight of the amount necessary to saturate the sheet and preferably less than 70% by weight on this basis; (3b) applying a backcoating composition to the uncoated side of the porous substrate and (3c) drying said backcoating composition. The backcoating composition contains a polymeric film-forming binder in a solution or in a dispersion, and finely divided pigment particles wherein the binder to pigment ($B/P$) weight ratio is at least 1:9 and the amount of backcoating applied is sufficient to deeply color the substrate while retaining the porosity of the sheet material.

Backcoating composition

A variety of coating compositions can be used for backcoating in the process of this invention. A primary requirement is that the composition penetrates and adequately colors the substrate of the sheet material without substantially reducing the porosity of the sheet. To accomplish this, the backcoating must contain a film-forming polymeric binder and finely divided pigment particles in a $B/P$ weight ratio of at least 1:9.

Organosols and solvent solutions of polymers containing pigments in the above $B/P$ ratio can be used as backcoating compositions with solvents which do not attack the polymers of the microporous sheet material. Preferably, a latex is used which is an aqueous dispersion that has a solids content of at least 1.0% and up to 50% by weight, and preferably, a viscosity up to 100 poises and more preferably from 1–20 centipoises. The solids portion of the latex is composed of a water-insoluble film-forming polymeric binder and pigment having a $B/P$ ratio of at least 1:9 and preferably from 5:1 to 1:1; and the latex contains from about 0.1 to 5% by weight, based on the weight of total latex, of a water-soluble wetting agent.

The film-forming polymeric binder used in the above latex is any of the broad class of water-insoluble vinyl addition polymers having $C_2$–$C_{20}$ monomeric units and preferably, polymers having $C_2$–$C_{12}$ monomeric units. The following are typically film-forming compounds useful in the process of this invention: alkyl esters of acrylic and methacrylic acid in which the alkyl group contains 1 to 12 carbon atoms; conjugated dienes having 4–10 carbon atoms, such as butadiene; olefins, such as ethylene; acrylonitrile; styrene; alkyl substituted styrene or vinyl acetate; or blends of two or more of these compounds.

One type of film-forming compound which is preferably used in this invention is an acrylic polymer consisting essentially of (A) 0.1–5% by weight of units of an $\alpha,\beta$-unsaturated monovinylidene carboxylic acid, preferably methacrylic acid or acrylic acid; (B) units of a methacrylic acid ester and (C) units of an acrylic acid ester in which both of the aforementioned esters are of a $C_1$ to $C_8$ saturated aliphatic monohydric alcohol. A particularly preferred polymer of this type contains 0.1–5% units of methacrylic acid, 30–40% by weight of units of methyl methacrylate and 50–70% by weight units of ethyl acrylate. Another useful polymer of this type with excellent adhesive and film-forming properties is the above acrylic polymer in the latex form which has been reacted with an alkylene imine, such as propylenimine or ethylenimine.

Butadiene/acrylonitrile polymers are also useful in this invention with the preferred polymer containing about 40–80% by weight of units of butadiene and 60–20% by weight of units of acrylonitrile.

Typical of the known methods of making polymer latices useful in the process of this invention are described in U.S. 2,395,017, 2,724,707, 2,787,603, and 3,032,521.

Any of the polymers used as a backcoating in this invention are required to have the physical properties which correspond to the use of the sheet material. In most instances, the backcoated suede sheet material made by the process of this invention will be used as a leather replacement in shoes, gloves, jackets and the like; therefore, the polymer of the backcoating composition must have the flexibility and the strength which coincide for this particular use. Also, the sheet material which is being backcoated should not retain more than 50% by weight of the sheet of solids of the backcoating composition to preclude any extensive change in the physical properties of the sheet due to the backing composition.

A variety of pigments are used within the aforementioned binder/pigment ratio in the backcoating composition of the process of this invention to give the desired color to the substrate so that it matches or complements the color of the suede topcoat. The following are some typically useful pigments which are dispersible in the preferred latex backcoating composition: "Phonsol" Yellow AR, Color Index No. 61725, which is the condensate of 1,5-diaminoanthraquinone and benzoyl chloride; "Phonsol" Brown ARN, C.I. No. 69015, which is the condensate of 1-benzamido-5-chloroanthraquinone and 1 - amino-4-benzoamidoanthraquinone reacted in the presence of copper and the condensate is subsequently treated with sulfuric acid; C.I. pigment blue 15, β-copper phthalocyanine; C.I. Vat Blue 14, which is the reaction product of chlorinate indathrone and sulfuryl chloride, and C.I. Pigment Green 7 prepared according to Example 1 of U.S. 2,247,752. Other useful colored pigments include carbon black, lamp black, the various iron oxides, lead chromates, chrome yellow, chrome orange molybdate orange, chrome green, etc.

Titanium dioxide is especially preferred as the white pigment. Other useful white pigments include zinc oxide, leaded zinc oxide, zinc sulfide, lead titanate, antimony oxide, zirconium oxide, white lead, basic lead silicate, lithopone, etc. Extender pigments can also be used which include calcium carbonate, Gilders Whiting, talc barytes, magnesium silicates, aluminum silicates, diatomaceous earth, asbestine, china clay, silica and fine mica.

For the backcoating composition in the latex form to adequately penetrate and color the substrate of the suede sheet material, the latex preferably contains about 0.1 to 5% by weight based on the weight of the latex of a wetting agent. Any of the ordinary water-soluble anionic or nonionic wetting agents can be used; the preferred is an anionic wetting agent, e.g., sodium lauryl sulfate. Other anionic wetting agents of a soluble alkali-metal and ammonium salts of half esters of sulfuric acid and a long chain fatty alcohol can also be used. Typical nonionic surfactants include alkylphenoxypolyethoxyethanols, such as octylphenoxypolyethoxyethanols, polyalkylene oxide derivatives of long chained carboxylic acids and the like. Numerous species of anionic and nonionic surfactants useful in this invention are listed in "Synthetic Detergents" by J. W. McCutcheon, published annually by McNair-Darland Company, New York Process for preparation of synthetic suede sheet material The improvement of this invention can be used in the suede making processes of the above mentioned J. L. Hollowell patents. The preferred process for making a synthetic suede sheet material is taught in the aforementioned U.S. application Ser. No. 216,576, now Patent No. 3,284,274. The following is one preferred process which includes the improvement of this invention.

A substrate is formed of a non-woven web, preferably of polyethylene terephthalate fibers, which is impregnated with a polymeric component, preferably a polyurethane polymer, which is coagulated into a porous polymeric structure, and a pigmented polymeric topcoating composition, preferably of a polyurethane polymer, is applied to the porous substrate. The polymeric topcoating is coagulated by bathing in a liquid, preferably water, which is miscible with the solvent of the topcoating composition and is a non-solvent for the polymer thereby producing a cellular coating in which the cells are elongated and in which the longest dimension of the cell is oriented substantially perpendicular to the plane of the sheet. All of the residual solvent is then removed from the topcoated sheet material, preferably by bathing in a water bath.

Before the backcoating composition is applied, the sheet is either dried completely or the non-solvent content of the sheet is reduced to less than 90% by weight of the amount necessary to saturate the sheet. Preferably, when water is the non-solvent, the water content of the sheet should be less than 50% by weight of the sheet material. The primary requirement of the backcoating composition is to deeply and uniformly color the substrate without penetrating the topcoat and without substantially reducing the porosity of the sheet. Any of the following well known methods can be used to apply the backcoating composition if this objective is accomplished: doctor knifing, extruding, dipping, spraying, brushing or roller coating. Preferably, the substrate of the sheet is dipped when a latex backcoating is applied. The backcoated sheet is then dried, preferably at 200–300° F.

It is much preferred to buff the backcoated surface of the sheet material to (1) accurately control the thickness of the sheet; (2) remove the polymeric skin which often forms during the drying of the sheet, which is caused by migration of the polymer of the backcoating composition to the uncoated surface of the substrate; and (3) produce a desired aesthetic effect. In this back-buffing step, about 1–10 mils of the back surface of the substrate are removed.

The surface "skin" or film of the topcoat is then removed by abrading or buffing about 2–6 mils from the surface of the topcoat which reveals the vertically oriented cell structure and gives the material a napped or suede appearance. The sheet material is scrubbed with water to remove dust from the abrasion of the topcoat and then the sheet is treated with an oil, stain and water repellent chemical, such as a fluorocarbon silicon emulsion and then dried.

Some of the advantages of the process of this invention and of the above preferred process are that a suede sheet material is produced which has a substrate that is uniformly colored throughout which matches or complements the color of the suede topcoat, and the color in the substrate is not easily rubbed off onto articles of clothing, such as socks or stockings which are in contact therewith, as often occurs if the substrate is dyed.

Polymers for the suede sheet material

Polymers useful in forming the substrate and top-coating composition of the suede sheet material are fully disclosed in the above patent application. Preferably, a polyurethane polymer is used for both the substrate and topcoat. Particularly durable suede sheet materials use a polymeric blend containing at least 50% by weight of units of a polyurethane polymer and up to 50% by weight of units of a vinyl chloride polymer in both the topcoating composition and in the substrate.

One preferred polyurethane polymer used in both the topcoating composition and in the substrate has a molecular weight of 5000–300,000 and is formed by reacting an organic diisocyanate with an active hydrogen containing material selected from the group consisting of polyalkylene ether glycols and hydroxyl terminated polyesters to produce an isocyanate terminated polyurethane prepolymer which is chain-extended with a compound having at least two amino nitrogen atoms, each having at least one reactive hydrogen attached thereto.

The examples which follow are given for purposes of illustrating the invention. All quantities shown are on a weight basis unless otherwise indicated.

EXAMPLE 1

Using the specific materials and procedures set forth below, a brown suede-like sheet material is formed by impregnating a non-woven web with a polyurethane solution and coagulating the polymer into a microporous form. This impregnated web is then coated on one side with a pigmented polyurethane topcoating composition and the topcoat is coagulated by bathing in a non-solvent which is miscible with the solvent of the topcoating composition under conditions which give a cellular layer in which the cells are tubular, elongated, with their longest dimension oriented substantially perpendicular to the plane of the sheet. The cells are thin walled and have an average diameter of 40–80 microns and have a thin microporous covering or "skin" over the surface of these cells. The solvent is removed from the sheet by bathing in a water bath and the water content of the sheet is reduced. Thereafter, the uncoated or back of the sheet material is coated with an aqueous dispersion to give the back side of the material substantially the same or a complementing color shade in relation to the color of the topcoat. The sheet is then dried and the backcoated side is buffed to give a smooth, even back surface with a pleasing aesthetic appearance. The thin covering or "skin" of the topcoat is then removed by buffing which exposes the cellular structure of the material giving the sheet a suede surface.

A polyurethane solution is prepared which is used in the impregnation of the non-woven substrate and for the topcoating of the impregnated substrate.

Polyurethane solution A

A 20% solids solution of polyurethane elastomer is prepared by first mixing 3343 parts of polytetramethylene ether glycol of about 1000 molecular weight with 291 parts of tolylene-2,4-diisocyanate and heating the mixture for 3 hours at 90° C. Then 2485 parts of the resulting hydroxyl-end-group-containing dimer are mixed with 570 parts of methylene-bis-(4-phenyl isocyanate). This mixture is heated for one hour at 80° C., yielding a prepolymer with isocyanate end groups. The prepolymer is dissolved in 10,000 parts of N,N-dimethyl formamide (sometimes referred to as dimethyl formamide), and the resulting solution is added slowly with continued mixing to a solution consisting of 50 parts of chain-extender dissolved in 1,710 parts of dimethyl formamide. The chain-extender consists of N-methylamino-bis-propylamine and hydrazine hydrate in a molar ratio of 40:60. The resulting reaction mixture is stirred at 40° C. for 30 minutes to form a polyurethane solution having a viscosity of about 115 poises and a polymer content of about 20%.

Preparation of the impregnated non-woven substrate

Solution 1.—The above Polyurethane Solution A is mixed with VAGH poly(vinyl chloride) copolymer solution which is a 12% solids solution of a copolymer of 85% vinyl chloride, 12% vinyl acetate and 3% vinyl alcohol dissolved in N,N-dimethyl formamide to form a 17% solids solution in which the weight ratio of polyurethane to vinyl copolymer is 94.4/5.6.

Solution 2.—About 1912 parts of the above Solution 1 are mixed with 300.8 parts of a VYHH poly(vinyl chloride/vinyl aceate) copolymer solution, 27% solids solution of a copolymer of 85% vinyl chloride and 15% vinyl acetate dissolvent in N,N-dimethyl formamide and having dispersed therein finely divided silica particles and wherein the weight ratio of copolymer to silica is 60/40. The water content of the solution is adjusted to 4.5% by weight by the addition of a 70/30 N,N-dimethyl formamide/water solution with the resulting solution having a solids content of 14.5%.

The above solutions are used to impregnate a porous non-woven mat about 250 mils thick of heat shrunk polyethylene terephthalate fibers about 1½ inches in length and 1.25 denier by immersing the non-woven web in the polymer solution which is maintained at 45° C. for several minutes. The polymer component in the web is then coagulated by immersing the mat in a water bath at about 25° C. for about 10 minutes.

The impregnated web is then passed into a water bath and over a vacuum filter drum position in this water bath. A vacuum of about 5 inches Hg is applied for several minutes to the drum which forces water through the web thereby removing all residual solvent and the web is dried and then split into three 45 mil thick sheets. The resulting polymer impregnated substrate has uniform porosity, flexibility and flex resistance.

Topcoating the impregnated non-woven substrate

A topcoating composition is prepared which is to be extruded on the above prepared impregnated substrate to form a cellular layer which is later buffered to give a suede material. The following ingredients are blended to form a 16% solids topcoating composition:

| | Parts by weight |
|---|---|
| Polyurethane Solution A (20% polymer solids) | 43.10 |
| VR–10 Poly(vinyl chloride) (12% polymer solids solution in dimethyl formamide) | 28.00 |
| VYHH Poly(vinyl chloride/vinyl acetate) copolymer solution in methylethyl ketone (8.9% solids) | 27.28 |
| Pigment blend (60 parts by weight molybdate orange which is a mixture of PbCrO$_4$, PbSO$_4$, PbMoO$_4$, 30 parts by weight Ferrite Yellow which is yellow iron oxide, 10 parts by weight lamp black) | 1.62 |
| Total | 100.00 |

About a 20 mil wet film of the topcoating composition is extruded onto the above prepared impregnated substrate and coagulated in a water bath to give a cellular layer with contiguous elongated tubular cells having an average diameter of 40–80 microns which have their longest dimension oriented substantially perpendicular to the plane of the sheet and a thin surface film or "skin" covers this cellular structure. Residual dimethyl formamide is removed from the sheet by bathing in a water bath and the water content of the sheet is reduced to about 40% by weight of the sheet by passing the sheet through nip rollers before it is backcoated.

Backcoating composition

An aqueous dispersion is prepared for backcoating the microporous sheet material by blending the following ingredients in a conventional mixing apparatus:

| | Parts by weight |
|---|---|
| Aqueous Brown pigment dispersion (25% solids of "Ponsol" Brown ARW, C.I. Vat Brown 3, C.I. 69015 which is formed by condensing 1-benzoamide-5-chloroanthraquinone with 1-amino-4-benzoamide-anthraquinone in the presence of copper followed by a reaction with sulfuric acid) | 1.07 |
| Aqueous Yellow pigment dispersion (25% solids of "Ponsol" Yellow AR., C.I. Vat Yellow 3, C.I. 61725, which is the condensate of 1,5-diaminoanthraquinone with benzoyl chloride) | 1.52 |
| Aqueous White pigment dispersion (70% solids of titanium dioxide pigment) | 1.70 |
| Aqueous acrylic polymer dispersion (45% polymer solids in which the polymer is 36.8% by weight methacrylate, 61.8% by weight ethyl acrylate and 1.4% by weight methacrylic acid) | 15.75 |
| "Duponol" ME (sodium lauryl sulfate) | 0.50 |
| Water | 79.46 |
| Total | 100.00 |

The resulting backcoating composition has a binder/pigment ratio of about 4:1, a solids content of 9%, and a viscosity of 5 centipoises.

The sheet material is fed around a coating drum in such manner so that the back or uncoated side of the sheet is dipped into the above aqueous dispersion which coats and colors the substrate to a brown color which complements the color of the topcoat. The sheet is then dried in a conventional drying tunnel at about 260° F. The back of the sheet is buffed in a Curtin-Hebert drum buffer which removes about 5–10 mils of the substrate and gives the back of the sheet an even smooth napped back which is uniformly colored throughout.

The skin or surface of the topcoat of the sheet is then buffed in the aforementioned buffer which removes about 3–4 mils of topcoat which reveals the vertically oriented cellular structure of the material and gives a sheet with a suede surface which has excellent smoothness and good grain break characteristics. The suede surface of the sheet material has a uniform brown color and the substrate of the sheet also has a deep brown color complementing the color of the suede surface resulting in a material which is pleasing and aesthetic on both sides and which is useful as a leather replacement in the manufacture of shoes, handbags and clothing, such as jackets and coats.

EXAMPLE 2

A sheet material is formed by the procedure of Example 1 using the identical impregnated non-woven substrate and a topcoat with the exception that in the topcoat the following pigment is substituted for the pigments used in Example 1 to give the topcoat a green color. The pigment used in the topcoat is Monastral Fast Green, 6 FNP–C.I. Green 7, C.I. 74260, prepared according to Example 1 of U.S.P. 2,247,752.

After the topcoat is formed as in Example 1, the sheet is dried and then the substrate or uncoated suede is backcoated with an aqueous dispersion.

Preparation of the backcoating composition

The following ingredients are blended together in a conventional mixing apparatus:

| | Parts by weight |
|---|---|
| Aqueous acrylic polymer dispersion—as described in Example 1 | 1405 |
| "Duponol" ME (sodium lauryl sulphate) | 50 |
| Water | 3827 |
| Aqueous white pigment dispersion (70% solids-titanium dioxide pigment) | 268 |
| "Monastral" Blue BB dispersion (25% solids-β-copper phthacyanine pigment, C.I. pigment Blue 15) | 107 |
| Supra Sperse Green dispersion (25% solids-phthalocyanine green pigment) | 43 |
| Total | 5700 |

The resulting backcoating composition has a binder/pigment ratio of 3:1, a solids content of 15% and a viscosity of 10 centipoises.

The sheet material is fed around a coating drum in such a manner so that the back of uncoated side of the sheet is dipped into the above aqueous dispersion which coats and colors the substrate to a green color which complements the color of the topcoat. The sheet is then dried in a conventional drying tunnel at about 260° F. The back of the sheet is then back buffed as in Example 1.

The skin or surface of the topcoat of the sheet is then buffed in a Curtin-Hebert drum buffer which removes about 3–4 mils of topcoat which reveals the vertically oriented cellular structure of the material and gives a sheet with a suede surface which has excellent smoothness and good grain break characteristics. The suede surface of the sheet material has a uniform green color and the back of the sheet also has a deep green color complementing the color of the suede surface resulting in a material which is pleasing and aesthetic on both sides and which is useful as a leather replacement in the manufacture of shoes, handbags and clothing, such as jackets and coats.

EXAMPLE 3

A sheet material is formed by the procedure of Example 1 using the identical impregnated non-woven substrate and a topcoat with the exception that in the topcoat the following pigment is substituted for the pigment used in Example 1 to give a topcoat of a deep black color. The pigment used in the topcoat is carbon black.

After the topcoat is formed as in Example 1, the sheet is dried and the substrate or uncoated side is backcoated with an aqueous dispersion.

Preparation of the backcoating composition

The following ingredients are blended together in a conventional mixing apparatus:

| | Parts by weight |
|---|---|
| Aqueous polymer dispersion C (35% solids in which the polymer is 35% by weight methyl methacrylate, 65% by weight ethyl acrylate) | 91 |
| "Duponol" ME (sodium lauryl sulphate) | 5 |
| Water | 860 |
| Aqueous carbon black dispersion (18% solids) | 45 |
| Total | 1001 |

The resulting backcoating composition has a binder/pigment ratio of 4:1, a solids content of 4%, and a viscosity of 2 centipoises.

The sheet material is fed around a coating drum in such manner so that the back or uncoated side of the sheet is dipped into the above aqueous dispersion which coats and colors the substrate to a black color which matches the color of the topcoat. The sheet is then dried in a conventional drying tunnel at about 260° F. The back of the sheet is then back buffed as in Example 1.

The top skin or surface of the topcoat of the sheet is then buffed in a Curtin-Herbert drum buffer which removes about 3–4 mils of topcoat which reveals the vertically oriented cellular structure of the material and gives a sheet with a suede surface which has excellent smoothness and good grain break characteristics. The suede surface of the sheet material has a uniform black color and the back of the sheet also has a deep black color matching the color of the suede surface resulting in a material which is pleasing and aesthetic on both sides and which is useful as a leather replacement in the manufacture of shoes, handbags and clothing, such as jackets and coats.

EXAMPLE 4

A sheet material is formed by the procedure of Example 1 using the identical impregnated non-woven substrate and a topcoat with the exception that in the topcoat, the following pigment is substituted for the pigment used in Example 1 to give a topcoat of a deep red color. The pigment used in the topcoat is "Monastral" Red B which is a gamma linear quinacridone prepared according to the process of U.S. Patent 2,844,581.

After the topcoat is formed as in Example 1, the sheet is dried and the substrate or uncoated side is backcoated with an aqueous dispersion.

Preparation of the backcoating composition

The following ingredients are blended together in a conventional mixing apparatus:

| | Parts by weight |
|---|---|
| Aqueous polymer dispersion C (35% solids described in Example 3) | 73 |
| Aqueous iminated polymer dispersion (35% polymer solids in which the polymer is 39% by weight methyl methacrylate, 57% by weight ethyl acrylate, 4% by weight methacrylic acid which has been reacted with 4.5% by weight propylenimine) | 18 |
| Aqueous Red pigment dispersion (18% solids "Monastral" Red B described above) | 45 |
| "Duponol" ME (sodium lauryl sulphate) | 5 |
| Water | 860 |
| Total | 1001 |

The resulting backcoating composition has a binder/pigment ratio of 4:1, a solids content of 4%, and a viscosity of 2 centipoises.

The sheet material is fed around a coating drum in such manner so that the back or uncoated side of the sheet is dipped into the above aqueous dispersion which coats and colors the substrate to a red color which complements the color of the topcoat. The sheet is then dried in a conventional drying tunnel at about 260° F. The back of the sheet is then back buffed as in Example 1.

The top skin or surface of the topcoat of the sheet is then buffed in a Curtin-Herbert drum buffer which removes about 3–4 mils of topcoat which reveals the vertically oriented cellular structure of the material and gives a sheet with a suede surface which has excellent smoothness and good grain break characteristics. The suede surface of the sheet material has a uniform red color and the back of the sheet also has a deep red color complementing the color of the suede surface resulting in a material which is pleasing and aesthetic on both sides and which is useful as a leather replacement in the manufacture of shoes, handbags and clothing, such as jackets and coats.

EXAMPLE 5

A sheet material is formed by the procedure of Example 1 using the identical impregnated non-woven substrate and a topcoat with the exception that the pigmented topcoat of Example 4 is used to give a topcoat of a deep red color.

After the topcoat is formed as in Example 1, the sheet is dried and the substrate or uncoated side is backcoated with an aqueous dispersion.

Preparation of the backcoating composition

The following ingredients are blended together in a conventional mixing apparatus:

| | Parts by weight |
|---|---|
| Terpolymer latex — (45% solids in which the terpolymer is the polymerization product of 69 parts butadiene, 26.5 parts acrylonitrile and 4.5 methacrylic acid | 91 |
| Zinc oxide | 5 |
| Sulphur | 1 |
| Red pigment dispersion (18% solids — "Monastral" Red B described in Example 4) | 45 |
| "Duponol" ME (sodium lauryl sulphate) | 5 |
| Water | 860 |
| Total | 1007 |

The resulting backcoating composition has a binder/pigment ratio of 4:1, a solids content of 5.3%, and a viscosity of 3 centipoises.

The sheet material is fed around a coating drum in such manner so that the back or uncoated side of the sheet is dipped into the above aqueous dispersion which coats and colors the substrate to a red color which complements the color of the topcoat. The sheet is then dried in a conventional drying tunnel at about 260° F. After the sheet is dried, it is held at this temperature for an additional five minutes to cure the backcoating composition. The back of the sheet is then buffed as in Example 1.

The top skin or surface of the topcoat of the sheet is then buffed in a Curtin-Hebert drum buffer which removes about 3–4 mils of topcoat which reveals the vertically oriented cellular structure of the material and gives a sheet with a suede surface which has excellent smoothness and good break characteristics. The suede surface of the sheet material has a uniform red color and the back of the sheet also has a deep red color complementing the color of the suede surface resulting in a material which is pleasing and aesthetic on both sides and which is useful as a leather replacement in the manufacture of shoes, handbags and clothing, such as jackets and coats.

I claim:

1. In the process for making a man-made microporous leather-like suede sheet material having good smoothness and grain break characteristics which comprises coating the surface of a porous flexible sheet material with a layer of a polymeric solution, coagulating the polymer solution of said layer into the form of a cellular structure by bathing in a liquid which is a non-solvent for the polymeric component and which is miscible with the solution, removing substantially all the solvent from said layer, and abrading the surface of the polymeric layer to form a leather-like suede material; the improvement in combination therewith comprising the additional steps before the surface of said polymeric layer is abraded; consisting essentially of reducing the non-solvent content to less than 90% by weight of the amount of non-solvent necessary to saturate said sheet, applying a backcoating composition to the uncoated side of the porous substrate in an amount amount sufficient to uniformly color said substrate and drying said back-coating composition, said backcoating composition containing a polymeric film-forming binder in a solution or in a dispersion and finely divided pigment particles, the binder to pigment weight ratio being at least 1:9.

2. The process of claim 1 in which (1) the cells of the cellular structure are elongated and oriented with their longest dimension in a substantially perpendicular orientation to the plane of the sheet, (2) the back of said porous substrate is abraded to a smooth, even surface after the backcoating composition is dried and (3) the backcoating composition comprises an aqueous dispersion having a solids content of at least 1.0% by weight and a viscosity up to 100 poises, said solids consisting essentially of a water-insoluble polymeric film-forming binder and finely divided pigment particles and about 0.1 to 5% by weight of a water-soluble wetting agent.

3. The process of claim 2 in which the polymeric film-forming binder is a water-insoluble vinyl addition polymer having $C_2$–$C_{20}$ monomeric units and the wetting agent is an anionic surfactant of a water-soluble alkali metal salt of a half ester of sulfuric acid and a long chain fatty alcohol.

4. The process of claim 2 in which the binder to pigment weight ratio is form about 5:1 to 1:1 and in which said sheet material retains up to 50% by weight solids of the aqueous dispersion after drying.

5. The process of claim 2 in which the film-forming polymeric binder consists essentially of (A) 0.1–5% by weight of units of an $\alpha,\beta$-unsaturated monovinylidene carboxylic acid (B) units of a methacrylic acid ester and (C) units of an acrylic acid ester, said esters of a $C_1$ to $C_8$ saturated aliphatic monohydric primary alcohol.

6. The process of claim 5 in which the film-forming polymeric binder is reacted with 0.1 to 5% by weight of an alkylene imine.

7. The process of claim 2 in which the polymeric film-forming binder consists essentially of 30–40% by weight of units of methyl methacrylate, 50–70% by weight of units of ethyl acrylate and 0.1 to 5% by weight of units of an α,β-unsaturated monovinylidene carboxylic acid and a wetting agent of sodium lauryl sulfate.

8. The process of claim 2 in which the polymeric film-forming binder consists essentially of 40–80% by weight of units of butadiene and 60–20% by weight of units of acrylonitrile and an anionic wetting agent of sodium lauryl sulfate.

9. The process of claim 2 in which polymeric component for forming said suede sheet material consists essentially of at least 50% by weight of units of a polyurethane polymer and up to 50% by weight of units of a vinyl chloride polymer.

10. The process of claim 9 in which the polyurethane polymer has a molecular weight of 5000–300,000 and is formed by reacting an organic diisocyanate with an active hydrogen containing material selected from the group consisting of polyalkyleneether glycols and hydroxyl terminated polyesters to produce an isocyanate terminated polyurethane prepolymer which is chain-extended with a compound having at least two amino nitrogen atoms, each having at least one reactive hydrogen attached thereto.

References Cited

UNITED STATES PATENTS

| 3,067,482 | 12/1962 | Hollowell | 28—74 |
| 3,067,483 | 12/1962 | Hollowell | 161—64 |
| 3,284,274 | 11/1966 | Hulslander et al. | 161—159 |

ALFRED L. LEAVITT, *Primary Examiner.*

C. R. WILSON, *Assistant Examiner.*

U.S. Cl. X.R.

117—68